Nov. 4, 1969     R. W. RICHARDSON     3,476,403

SAFETY DEVICE

Filed Sept. 11, 1967

INVENTOR.
ROBERT W. RICHARDSON
BY
*Yount, Raney, Flynn and Tarolli*
ATTORNEYS

United States Patent Office

3,476,403
Patented Nov. 4, 1969

3,476,403
SAFETY DEVICE
Robert W. Richardson, Orchard Lake, Mich., assignor to Eaton Yale & Towne Inc., Cleveland, Ohio, a corporation of Ohio
Filed Sept. 11, 1967, Ser. No. 666,690
Int. Cl. B60r 21/08, 21/02
U.S. Cl. 280—150                              6 Claims

ABSTRACT OF THE DISCLOSURE

A safety device for protecting an occupant or occupants of a vehicle during a collision includes an inflatable confinement which is normally disposed in a contracted inoperative condition and is inflated to an expanded operative condition by a flow of pressurized fluid thereinto. The flow of fluid into the confinement is controlled to minimize the kinetic energy of the fluid.

---

The present invention relates to a vehicle safety device, and in particular relates to a vehicle safety device for protecting an occupant of the vehicle against injury during a collision.

Safety devices which include an inflatable confinement are known. The confinement is inflated to an expanded operative condition by a flow of fluid thereinto. The confinement when inflated operates to restrain movement of an occupant or occupants of the vehicle during a collision. In these known safety devices the flow of fluid into the confinement is at a very rapid rate and is directed toward an end wall portion of the confinement which is adapted to be positioned adjacent the occupant and against which the occupant impacts during the collision. Such rapid flow against the end wall portion of the confinement may cause the confinement to be rapidly expanded and in some circumstances, the end wall portion of the confinement may strike the occupant and cause injury to the latter.

Accordingly, it is an important object of the present invention to provide a new and improved safety device of the character referred to, and in which the expansion of the confinement is controlled so as to minimize or alleviate the above-noted problem.

Another object of the present invention is to provide a new and improved safety device of the character referred to, and in which the safety device includes a means for initially controlling the flow of fluid into the confinement to minimize the kinetic energy of the fluid so that the impact force of the fluid striking wall portions of the confinement is minimized.

A further object of the present invention is to provide a new and improved safety device, as defined in the next preceding paragraph, and wherein the means for initially controlling the flow of fluid into the confinement includes a diffuser means having a plurality of openings therein which are oriented such that adjacent pairs of openings direct the fluid in jet streams which impinge upon one another and effect a dispersion of the fluid.

A still further object of the present invention is to provide a new and improved safety device, as noted above, and wherein the means for controlling the flow of fluid into the confinement comprises a deflector means positioned adjacent the opening in fluid reservoir and against which the fluid impinges prior to flowing into the confinement.

Yet another object of the present invention is to provide a new and improved safety device of the character referred to, and in which the pressurized fluid is dispersed into the confinement in plural directions to thereby minimize fluid impact on a given wall portion of the confinement.

The present invention resides in certain novel constructions and arrangement of parts, and other objects, novel characteristics and advantages of the present invention will be apparent from the following detailed description and from the accompanying drawing forming a part of this specification, and in which similar reference numerals are employed to designate corresponding parts throughout several views of the drawing and in which.

Figure 1:
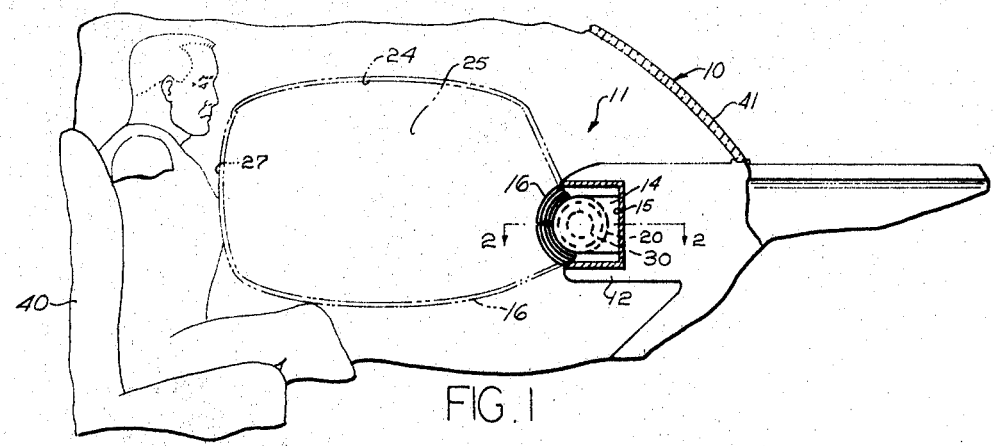
FIG. 1 is a fragmentary view of a vehicle embodying a safety device of the present invention.

The present invention provides an improved vehicle safety device. The novel safety device of the present invention can be employed in various kinds or types of vehicles, but is particularly susceptible for use in automotive vehicles and airplanes. For the purposes of illustration a safety device 11 is herein shown as being applied to an automobile 10.

The safety device 11 is mounted within the dashboard 12 of the automobile 10. The safety device 11 includes a bracket means 14 which is suitably secured to a dashboard support structure 15 and an inflatable confinement or bag 16. The inflatable confinement 16 is normally disposed in a contracted inoperative condition, as shown by solid lines in FIG. 1.

The confinement 16 surrounds a diffuser tube 20 suitably carried by the bracket means 14 and which is provided with a plurality of through openings 22 in its side wall 23. The confinement 16 comprises a wall means 24 defining an inner chamber 25 which is in communication with the interior of the diffuser tube 20 via the openings 22 in the diffuser tube. The wall means 24 includes an end wall portion 27 which is disposed or positioned adjacent the occupant, when the confinement 16 is inflated to an expanded condition, as shown by the phantom lines in FIG. 1 and against which the occupant impacts during a collision.

The confinement is inflated by a fluid contained within a container or reservoir 30. The container 30 is disposed within the diffuser tube 20 and is shown by way of example in the drawings as being cylindrical in shape. The cylindrical container 30 is adapted to be opened to permit release of the fluid therein. The container 30, is shown as being opened, in response to actuation of an explosive charge 36. The explosive charge 36 is disposed adjacent the cylinder 30. The charge 36 is exploded in any suitable manner as by passing an electric current through a pair of lead wires 38 and 39 associated with the charge 36 to ignite the charge 36 when the current flows therethrough.

The explosive charge 36 is adapted to be exploded during a collision. To this end, a suitable collision sensing device (not shown), is provided and electrically interconnected with the battery (not shown) of the automobile 10 and the lead wires 38 and 39, and in a manner well known to those skilled in the art, so that the charge 36 will be exploded in response to a collision condition occurring.

From the foregoing, it can be seen that when a collision occurs, the sensing device (not shown) causes an electric current to be passed through the lead wires 38, 39 to ignite the explosive charge 36. The explosive charge 36 when ignited causes the cylindrical container 30 to be opened to allow release of the pressurized fluid therefrom. The released fluid flows into the diffuser tube 20 and then through the openings 22 into the confinement 16 to inflate the latter.

The wall portion 27 of the confinement 16 as the latter is being inflated moves outwardly of the dashboard 12 toward the back of the front seat 40 of the automobile 10. The confinement when inflated assumes the position shown by the phantom lines in FIG. 1. The confinement 16, when inflated, provides a restraint against which the occupant impacts, and prevents the occupant from being thrown forcefully forwardly against the dashboard 12 and/or the windshield 41 of the automobile 10. The confinement 16 permits some movement of the occupant but controls the occupant's movement to protect the occupant.

In accordance with the provisions of the present invention, the expansion of the inflatable confinement 16 is controlled to prevent the end wall portion 27 from striking the occupant with a force which could possibly cause injury to the occupant. The expansion is controlled by controlling the flow of the high pressure fluid into the confinement 16 to minimize the kinetic energy of the fluid so that the force of the fluid striking the end wall portion 27 to move the latter toward the occupant is minimized. By minimizing or reducing the kinetic energy of the fluid, the end wall portion 27 is moved toward the occupant at a relatively slow speed such that even if the end wall portion 27 engages or hits the occupant, the force of the impact is lessened.

Figure 2:
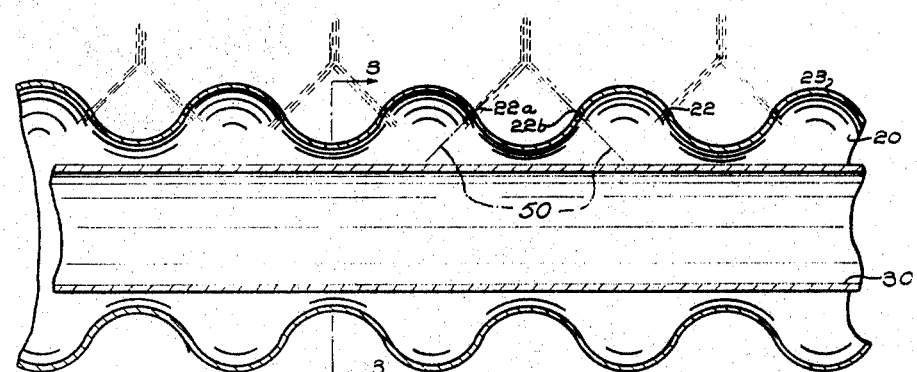
FIG. 2 is a fragmentary sectional view of the safety device shown in FIG. 1 and taken approximately along the line 2—2 of FIG. 1.
Figure 3:
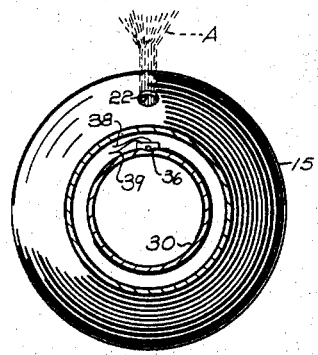
FIG. 3 is a sectional view taken approximately along line 3—3 of FIG. 2.

To this end, the diffuser tube 20 is of a construction such that the high pressure fluid is emitted by the diffuser tube 20 in jet streams and with adjacent pairs of the jet streams impinging one another so that the kinetic energy of the fluid is minimized and the fluid is diffused to evenly open the confinement as rapidly as possible without damaging the confinement or injuring the occupant. As best shown in FIG. 2 the side wall 23 of the diffuser tube 20, as viewed in longitudinal cross-section, is of a corrugated or serpentine shape and the openings 22 in the diffuser tube 20 are located between the outer and innermost ends of the corrugations. The openings are oriented such that the axes 50 of the openings 22 extend non-perpendicularly to the plane of the end wall portion 27. Moreover, the axes of adjacent openings 22 in adjacently facing outer sides of the corrugations intersect each other at locations outwardly of the diffuser tube 20 so that the jets of fluid being emitted therefrom strike or impinge upon each other to cause a dispersion of the fluid flow and hence, a reduction in the kinetic energy of the fluid flowing into the confinement 16. Referring more specifically to FIG. 2, the flow through openings 22a and 22b impinge upon each other with the result being that the fluid is dispersed or spread, as indicated at A in FIG. 3.

From the foregoing, it can be seen that the diffuser tube 20 controls the expansion of the confinement 16 by reducing or minimizing the kinetic energy of the fluid flowing into the confinement 16. This lessens the speed at which the end wall portion 27 of the confinement 16 is expanded outwardly of the dashboard 12 toward the occupant and thus, minimizes the force with which the end wall portion 27 might strike the occupant. Moreover, this also minimizes or prevents tearing of the confinement from the diffuser tube 20.

Figure 4:
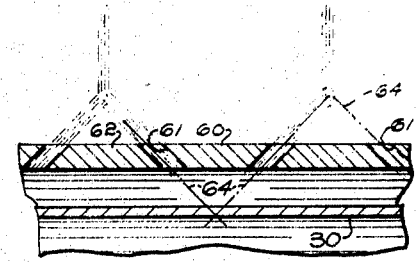
FIG. 4 is a fragmentary sectional view of an alternate embodiment of the present invention.

FIGURE 4 illustrates an alternate safety device similar to that described above but including an alternate diffuser tuze 60 which may be used in place of the diffuser tube 20 shown in FIG. 1. The diffuser tube 60 is cylindrical in shape and has a plurality of openings 61 in its side wall 62. The openings 61 are oriented such that their axes 64 extend non-perpendicular to the plane of the end wall portion 27 of the confinement 16 and such that the axes of adjacent pairs of openings intersect each other at locations outwardly of the diffuser tube 60. As a result, the jets of fluid emitted from the openings 61 impinge against each other to cause a dispersion of the fluid flow and hence, a reduction in the kinetic energy of the fluid flowing into the confinement 16. The diffuser tube 60 functions to control the expansion of the confinement, in the same manner as previously described above for the diffuser tube 20.

From the foregoing it should be apparent that the hereinbefore enumerated objects and others have been accomplished and that a new and improved safety device for protecting an occupant of a vehicle has been provided by the present invention.

Having described my invention, I claim:

1. Apparatus comprising a confinement having a contracted inoperative condition and an expanded operative condition, said confinement when in said operative condition controlling movement of an occupant of the vehicle during a vehicle collision, a source of fluid, means providing for fluid flow from said source of fluid to effect expansion of said confinement, and means for controlling the flow of said fluid to said confinement to minimize the kinetic energy of the fluid and control inflation of the confinement, said means for controlling the fluid flow comprising means for effecting a dispersion of the fluid while flowing to said confinement, and including diffuser means located in the path of said fluid flow, said diffuser means having surface portions defining openings through which fluid flows upon being released from said container and which openings are disposed so that fluid streams from adjacent openings impinge against each other to provide said dispersion.

2. Apparatus comprising a confinement having a contracted inoperative condition and an expanded operative condition, said confinement when in said operative condition controlling movement of an occupant of the vehicle during a vehicle collision, a source of fluid, means providing for fluid flow from said source of fluid to effect expansion of said confinement, and means for controlling the flow of said fluid to said confinement to minimize the kinetic energy of the fluid and control inflation of the confinement, said means for controlling the flow of said fluid including diffuser means located in the path of fluid flow, said diffuser means having a plurality of openings having the axes thereof extending angularly with respect to each other, and the axes of pairs of said openings intersecting each other to enable streams of fluid emitted from said pairs of openings to impinge against each other.

3. Apparatus comprising a diffuser member in the path of a flow of fluid, said diffuser member having a plurality of openings in a wall portion thereof and through which the fluid is emitted in jet streams, and pairs of said openings oriented to enable jet streams of fluid emitting from said pairs of openings to impinge upon one another, said wall portion of said diffuser member being corrugated in longitudinal cross section and said openings being located on corrugations thereof.

4. Apparatus comprising an inflatable confinement having a contracted condition and an expanded condition, said confinement having a wall portion for receiving the impact of the occupant during a vehicle collision, a source of fluid, means providing for fluid flow from said source of fluid to effect expansion of said confinement, a diffuser member in the path of said fluid flow, said diffuser member having a plurality of openings in a wall portion thereof and through which the fluid is emitted in jet streams, and pairs of said openings oriented to enable jet streams of fluid emitting from said pairs of openings to impinge upon one another.

5. Apparatus as defined in claim 4 wherein said diffuser member is substantially cylindrically shaped.

6. Apparatus as defined in claim 4 wherein said wall portion of said diffuser tube is corrugated in longitudinal cross-section, and wherein said openings are located on a corrugation.

References Cited

UNITED STATES PATENTS

| | | | |
|---|---|---|---|
| 2,760,817 | 8/1956 | Novak | 299—18 |
| 2,850,291 | 9/1958 | Ziccardi | 280—150 |
| 3,197,234 | 7/1965 | Bertrand | 280—150 |

LEO FRIAGLIA, Primary Examiner

JOEL E. SIEGEL, Assistant Examiner